(12) United States Patent
Long

(10) Patent No.: US 12,452,231 B2
(45) Date of Patent: Oct. 21, 2025

(54) METHOD FOR AUTHORIZING A SERVICE

(71) Applicant: DIGITAL FIRST HOLDINGS LLC, Atlanta, GA (US)

(72) Inventor: Justin Long, Kennesaw, GA (US)

(73) Assignee: DIGITAL FIRST HOLDINGS LLC, Atlanta, GA (US)

( * ) Notice: Subject to any disclaimer, the term of this patent is extended or adjusted under 35 U.S.C. 154(b) by 139 days.

(21) Appl. No.: 18/217,194

(22) Filed: Jun. 30, 2023

(65) Prior Publication Data
US 2025/0007904 A1 Jan. 2, 2025

(51) Int. Cl.
*G06F 21/00* (2013.01)
*H04L 9/40* (2022.01)

(52) U.S. Cl.
CPC ........... *H04L 63/083* (2013.01); *H04L 63/10* (2013.01)

(58) Field of Classification Search
CPC ... H04L 63/083; H04L 63/10; G06Q 20/1085; G06Q 20/4014
See application file for complete search history.

(56) References Cited

U.S. PATENT DOCUMENTS

| | | | | |
|---|---|---|---|---|
| 2019/0164165 | A1* | 5/2019 | Ithabathula | G06F 21/34 |
| 2020/0005262 | A1* | 1/2020 | Arora | G06Q 20/3224 |
| 2021/0250345 | A1* | 8/2021 | Thacker | H04L 63/0853 |
| 2021/0344659 | A1* | 11/2021 | Bloom | G06Q 20/227 |
| 2024/0111852 | A1* | 4/2024 | Badri | G06F 21/33 |
| 2024/0370843 | A1* | 11/2024 | Cristache | G06Q 30/0215 |

OTHER PUBLICATIONS

Nov. 15, 2024 Search Report in corresponding European Patent Appl. No. 24185456.1.
European examination report for corresponding European Patent Appl. No. 24185456.1, dated Aug. 13, 2025.

* cited by examiner

*Primary Examiner* — Kendall Dolly
(74) *Attorney, Agent, or Firm* — Notaro, Michalos & Zaccaria P.C.; John S. Economou

(57) ABSTRACT

A data processing system comprises a first authenticator device, a second authenticator device, a user device, and a service device. The first authenticator device receives data associated with a user. The first authenticator device calculates first authentication data based on the user data. The first authenticator device transmits the first authentication data to the user device. The second authenticator device receives data associated with the user. The second authenticator device calculates second authentication data based on the user data. The second authenticator device transmits the second authentication data to the user device. Using the service device, the user requests a service. The user device transmits the first authentication data and the second authentication data to the service device. The service device calculates an authentication score. The service device compares the authentication score relative to a pre-defined threshold. Based on the comparison, the service device processes the requested service.

9 Claims, 1 Drawing Sheet

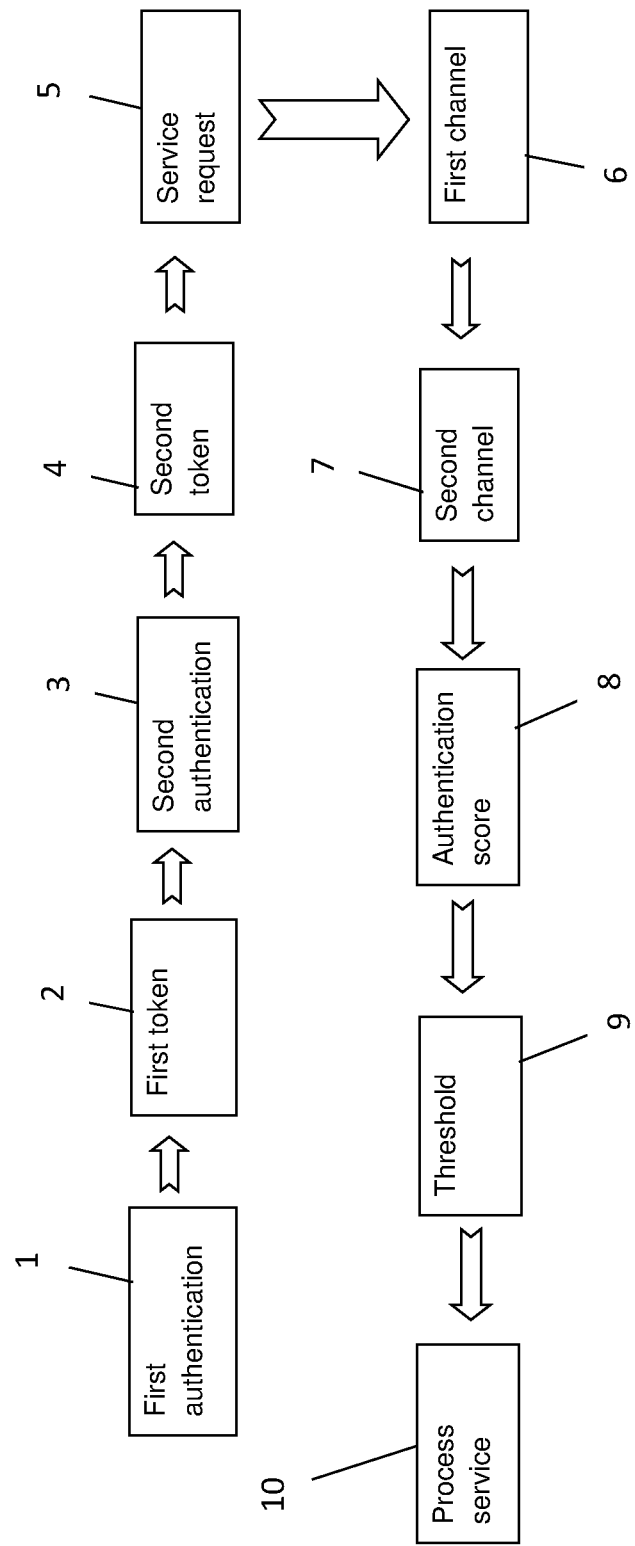

METHOD FOR AUTHORIZING A SERVICE

FIELD OF THE INVENTION

This invention relates to a computer-implemented method for authorizing a service.

BACKGROUND

It is known for a customer to perform financial transactions using an automated teller machine (ATM) or with a mobile web interface. However known approaches suffer from the problem of fraudulent actions being performed by a third party, such as stealing of customer data or unauthorised access to a customer bank account.

This invention is aimed at providing an improved method which overcomes at least some of these difficulties.

SUMMARY

According to the invention there is provided a computer-implemented method for authorizing a service, the method comprising the steps of: receiving a service request from a user, receiving first authentication data from a first authenticator, receiving second authentication data from a second authenticator, the second authenticator being different to the first authenticator, and processing the requested service based on the first authentication data and the second authentication data.

By analysing both the first authentication data from the first authenticator and the second authentication data from the second authenticator, the method of the invention achieves enhanced data security. It is therefore more difficult for a fraudulent third party to gain authorisation to have a service performed, such as stealing funds from a customer bank account.

The first authentication data may be received on a first data channel from the first authenticator. The second authentication data may be received on a second data channel from the second authenticator, the second data channel being different to the first data channel.

For example the authentication data may be an image captured by a camera of a mobile phone. The channel used to transmit the authentication data may be the mobile phone communication channel.

For example the authentication data may be a fingerprint captured by a reader of a mobile phone. The channel used to transmit the authentication data may be the mobile phone communication channel.

For example the authentication data may be location data of a mobile phone relative to a location of a teller machine, or image data, or text data.

For example the authentication data may be a textual phrase or an image displayed to a user at a first channel. The user may be prompted to remember the textual phrase or the image, and to subsequently input the textual phrase or the image at a second channel.

For example the channel used to transmit the authentication data may be a video communication channel. The authentication data may be time data for a user to travel to a teller machine.

For example because the system has information of when a customer is scheduled to arrive at a teller machine, this pre-staging information allows for a higher number of factors/security claims. The factor/security claim may be a known location of the communication session, or a known time of the communication session, or a known participant in the communication session, or a known device taking part in the communication session, or a known identification feature such as clothes of a person in the communication session. The system enables more factors/security claims to be ascertained and thus allows for enhanced security.

The first authentication data channel collaborates with the second authentication data channel. The invention uses multiple authentication data factors on multiple authentication data channels to make the decision of whether the user should be authorised to receive the requested service.

The method may comprise the step of: determining an authentication score based on the first authentication data and the second authentication data, the requested service being processed based on the authentication score.

For example because the system has information of when a customer is scheduled to arrive at a teller machine, this pre-staging information allows for a higher number of factors/security claims. The factor/security claim may be a known location of the communication session, or a known time of the communication session, or a known participant in the communication session, or a known device taking part in the communication session, or a known identification feature such as clothes of a person in the communication session. The system enables more factors/security claims to be ascertained and thus allows for enhanced security. A score may be assigned to each factor/security claim that the data channel may use.

One participant in a communication session may provide information to other participants in the communication session in relation to which communication channels and which factors/security claims are available for the participant to use. The available communication channels of the participants and available factors/security claims may be added to or upgraded over time.

The system obtains the information relating to the factors/security claims during the communication session.

The method may comprise the step of: comparing the authentication score relative to a pre-defined threshold, the requested service being processed based on the comparison.

This threshold may be fixed. Alternatively this threshold may be flexible and vary over time. This threshold may vary depending on attributes of the user. This threshold may vary depending on which communication channels are available for a participant to use. The available communication channels of participants may be added to or upgraded over time.

The method may comprise the step of initiating a communication session with the user based on the first authentication data and the second authentication data. By analysing both the first authentication data from the first authenticator and the second authentication data from the second authenticator, the method of the invention achieves enhanced data security. In particular it is ensured that the communication is with the correct authorised customer and not with a fraudulent third party. The communication session may be initiated between the user and a second communication session participant. The second communication session participant may comprise at least one of a bank teller, an automated machine, a machine learning tool, a computer program, a sales professional, an insurance agent, a mortgage agent, an underwriter, a loan specialist, a receptionist, or a pooled resource manager.

The method may comprise the steps of: the authenticator receiving data associated with the user, and the authenticator determining the authentication data based on the user data.

The authentication data may be calculated locally at the authenticator and stored locally for enhanced data security of personal data. Alternatively the authentication data may be calculated remotely at a central server for more efficient data storage.

The method may comprise the steps of: the authenticator creating a security encryption token, and the authenticator associating the security encryption token with the authentication data.

The security encryption token may be calculated based on the factor/security claim. The security encryption token may be calculated based on the communication means. The system may include a further token assignor element to assign the security encryption token to the authentication data.

The authenticator may comprise a static device at a first location. The authenticator may comprise at least one of a video camera, a facial recognition device, a fingerprint identifier device, an iris scanner device, a personal identification number (PIN) checking device, a password checking device, a backend security database, a microphone to receive audio or voice data, a clock to determine a time for a user to travel to a location of a teller machine, a clock to determine a time for a user to wait for a service to be performed, an image recognition device to determine one or more features in an image, or a biometric data receiver device.

The method may comprise the step of the authenticator transmitting the authentication data to a user device. The user is thus effectively in possession of the authentication data, and the user is therefore no longer bound to the originating authenticator. The user device may comprise a mobile device. It is therefore possible for the user to travel away from the originating authenticator. The method may comprise the step of a service device receiving the authentication data from the user device. In this manner it is possible for the user to interact with a wide variety of different service devices. The service device may comprise a static device at a second location. The user may travel from the originating authenticator at the first location to the service device at the second location. The first location may be located remotely from the second location. In this manner it is possible for the user to interact with service devices in any possible physical location. The service device may comprise at least one of a teller machine, a cash dispenser device, a printer device, a display device, a user interface device, a document scanner device, or an Internet of Things (IoT) enabled device.

In another aspect of the invention there is provided a data processing system for authorizing a service, the system comprising a processor configured to: receive a service request from a user, receive first authentication data from a first authenticator, receive second authentication data from a second authenticator, the second authenticator being different to the first authenticator, and process the requested service based on the first authentication data and the second authentication data.

By analysing both the first authentication data from the first authenticator and the second authentication data from the second authenticator, the system of the invention achieves enhanced data security. It is therefore more difficult for a fraudulent third party to gain authorisation to have a service performed, such as stealing funds from a customer bank account.

The invention also provides in another aspect a computer program product stored on a non-transitory computer readable storage medium, the computer program product comprising instructions capable of causing a computer system to perform a method of the invention when the computer program product is executed on the computer system.

BRIEF DESCRIPTION OF THE DRAWING

An embodiment of the invention will be described hereinafter, by way of example only, with reference to the accompanying drawing, in which:

FIG. 1 is a flow diagram of a method according to the invention for authorizing a service.

DETAILED DESCRIPTION

Referring to FIG. 1 there is illustrated a data processing system according to the invention in use. The system may be employed to authorise a user to receive a service, for example to allow a customer to perform a financial transaction using an automated teller machine (ATM).

The system comprises a first authenticator device, a second authenticator device, a user device, and a service device.

In this case the first authenticator device is provided in the form of a static device at a first location. The first authenticator device may be a video camera, and/or a facial recognition device, and/or a fingerprint identifier device, and/or an iris scanner device, and/or a personal identification number (PIN) checking device, and/or a password checking device, and/or a backend security database.

The first authenticator device receives data associated with a user. For example the first authenticator device may be a video camera to capture an image of a face of the user. The first authenticator device calculates first authentication data 1 based on the user data. The first authenticator device also creates a first security encryption token 2, and links the first security encryption token 2 to the first authentication data 1. The first security encryption token 2 prevents tampering of the first authentication data 1.

The first authenticator device then transmits the first authentication data 1 and the first security encryption token 2 to the user device. If the data transmission fails, the first authenticator device displays a prompt message to the user to attempt an alternative authentication means.

The second authenticator device is different to the first authenticator device. In this case the second authenticator device is provided in the form of a static device at another location. The second authenticator device may be a video camera, and/or a facial recognition device, and/or a fingerprint identifier device, and/or an iris scanner device, and/or a personal identification number (PIN) checking device, and/or a password checking device, and/or a backend security database.

The second authenticator device receives data associated with the user. For example the second authenticator device may be a fingerprint identifier device to scan a fingerprint of the user. The second authenticator device calculates second authentication data 3 based on the user data. The second authenticator device also creates a second security encryption token 4, and links the second security encryption token 4 to the second authentication data 3. The second security encryption token 4 prevents tampering of the second authentication data 3.

The second authenticator device then transmits the second authentication data 3 and the second security encryption token 4 to the user device. If the data transmission fails, the second authenticator device displays a prompt message to the user to attempt an alternative authentication means.

The second authentication data 3 is different to the first authentication data 1.

In this case the user device is provided in the form of a mobile device.

In this case the service device is provided in the form of a static device at a second location. The service device may be a teller machine, and/or a cash dispenser device, and/or a printer device, and/or a display device, and/or a user interface device, and/or a document scanner device, and/or an Internet of Things (IoT) enabled device.

The first location is located remotely from the second location. For example the first location may be in a bank branch, and the second location may be at an ATM device located remotely from the bank branch.

The user travels from the first location to the second location. Using the service device, the user requests a service 5.

The user device transmits the first authentication data 1 and the second authentication data 3 to the service device. In particular the first authentication data 1 is transmitted on a first data channel 6 from the user device to the service device, and the second authentication data 3 is transmitted on a second data channel 7 from the user device to the service device. The second data channel 7 is a different channel to the first data channel 6.

If the data transmission fails, the service device displays a prompt message to the user to attempt an alternative authentication means.

The service device calculates an authentication score 8 using the first authentication data 1 and the second authentication data 3. The service device compares the authentication score 8 relative to a pre-defined threshold 9. Based on this comparison, the service device processes 10 the requested service 5. For example the service device may initiate a communication session between the user and a second communication session participant. The second communication session participant may be a bank teller, and/or an automated machine, and/or a machine learning tool, and/or a computer program.

As another example the first authenticator device may be a video camera on a customer mobile device. The first authentication data 1 may be a first image data of the customer from a first angle. The second authenticator device may be a video camera on an ATM device. The second authentication data 3 may be a second image data of the customer from a second angle. The service device analyses the first image data and the second image data to calculate the authentication score 8.

As a further example the first authenticator device may be a kiosk with a fingerprint identifier device. The kiosk scans a fingerprint of the user. The kiosk calculates the first authentication data 1 based on the scanned fingerprint. The user device may be a mobile device. The kiosk transmits the first authentication data 1 to the mobile device by the user tapping the mobile device at the kiosk. The service device may be an ATM device. The customer travels from the kiosk to the ATM device. The ATM device has no fingerprint identification capability in this case. The mobile device transmits the first authentication data 1 to the ATM device. The system of the invention enables the first authentication data 1 to be transferred from the first authenticator device to the mobile user device to the service device.

Throughout the description and claims of this patent specification, the words "comprise" and "contain" and variations of them mean "including but not limited to" and they are not intended to and do not exclude other moieties, additives, components, integers or steps. Throughout the description and claims of this patent specification, the singular encompasses the plural unless the context otherwise requires. In particular, where the indefinite article is used, the patent specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this patent specification including any accompanying claims, abstract and drawings, and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this patent specification including any accompanying claims, abstract and drawings, or to any novel one, or any novel combination, of the steps of any method or process so disclosed.

What is claimed is:

1. A computer-implemented method for authorizing a service, the method comprising:

receiving first user data at a first authenticator device located at a first location, generating, at the first authenticator device, first authentication data based on the first user data, generating, at the first authenticator device, an associated first security encryption token for the first authentication data, and linking the first security encryption token to the first authentication data, forwarding, at the first authenticator device, the first authentication data and the linked first security encryption token to a user device, receiving second user data that is different from the first user data at a second authenticator device located at a second location that is located remote from the first location, generating, at the second authenticator device, second authentication data based on the second user data, generating, at the second authenticator device, an associated second security encryption token for the second authentication data, and linking the second security encryption token to the second authentication data, forwarding, at the second authenticator device, the second authentication data and the linked second security encryption token to the user device;

receiving, at a service device, a service request from a user via the user device, receiving, at the service device, the first authentication data from the user device via a first data channel, receiving, at the service device, the second authentication data from the user device via a second data channel that is different from the first data channel, calculating, at the service device, an authentication score, by comparing the first and second authentication data to a pre-defined threshold associated with the user, and authorizing the requested service if the authentication score exceeds the predefined threshold.

2. The method as claimed in claim 1 wherein the method comprises initiating a communication session with the user based on the first authentication data and the second authentication data.

3. The method as claimed in claim 2 wherein the communication session is initiated between the user and a second communication session participant.

4. The method as claimed in claim 3 wherein the second communication session participant comprises at least one of a bank teller, an automated machine, a machine learning tool, or a computer program.

5. The method as claimed in claim 1 wherein the first authenticator comprises a static device at a first location.

6. The method as claimed in claim 1 wherein one of the first authenticator or the second authenticator comprises at least one of a video camera, a facial recognition device, a fingerprint identifier device, an iris scanner device, a personal identification number (PIN) checking device, a password checking device, or a backend security database.

7. The method as claimed in claim 1 wherein the user device comprises a mobile device.

8. The method as claimed in claim 1 wherein the service device comprises a static device at a second location.

9. The method as claimed in claim 1 wherein the service device comprises at least one of a teller machine, a cash dispenser device, a printer device, a display device, a user interface device, a document scanner device, or an Internet of Things (IoT) enabled device.

* * * * *